UNITED STATES PATENT OFFICE.

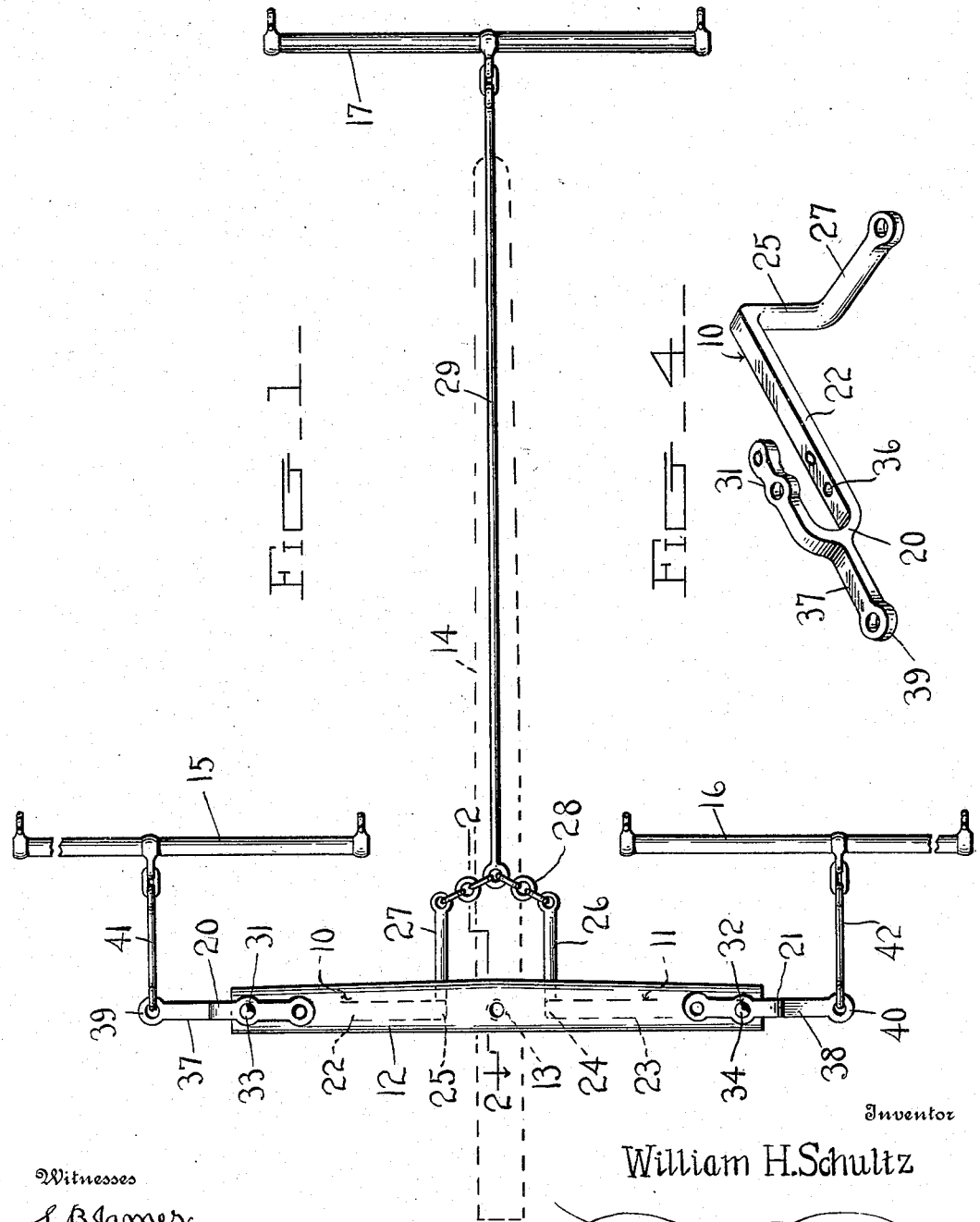

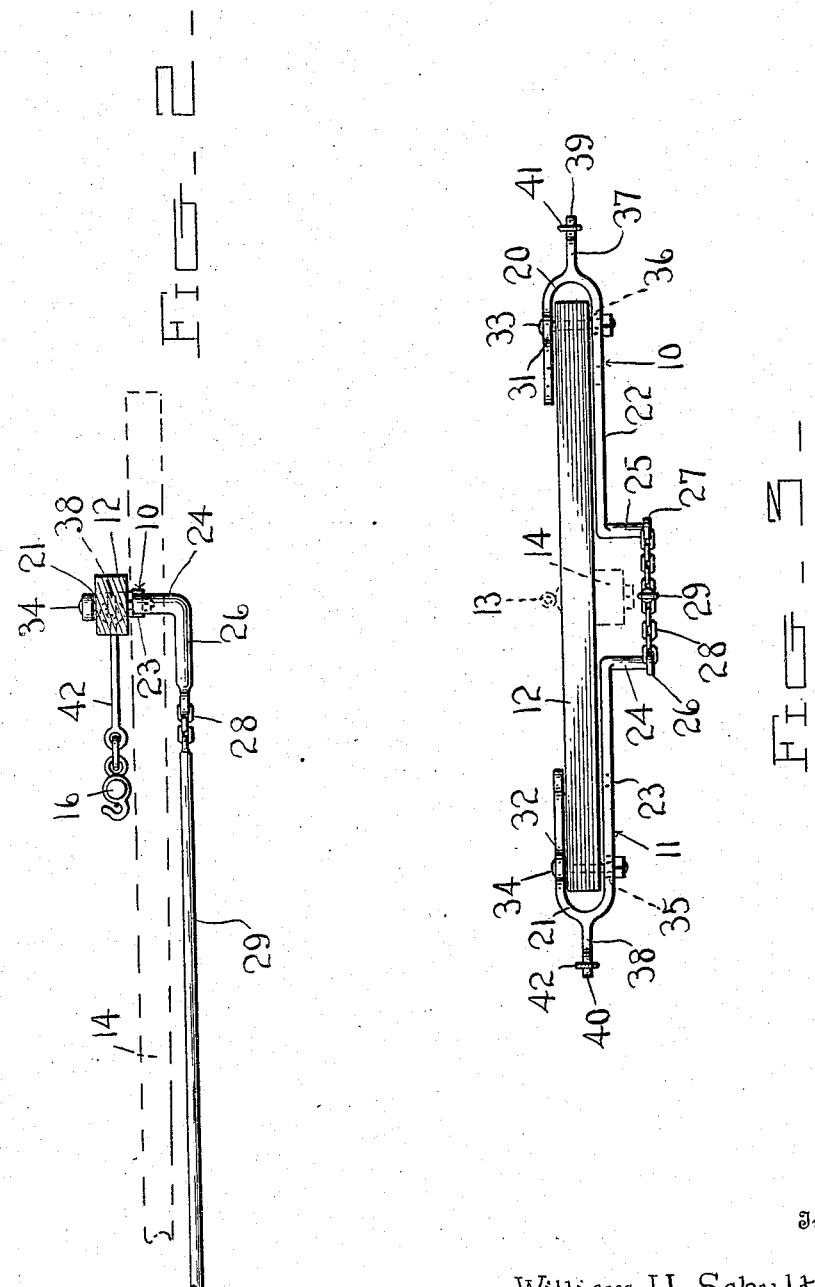

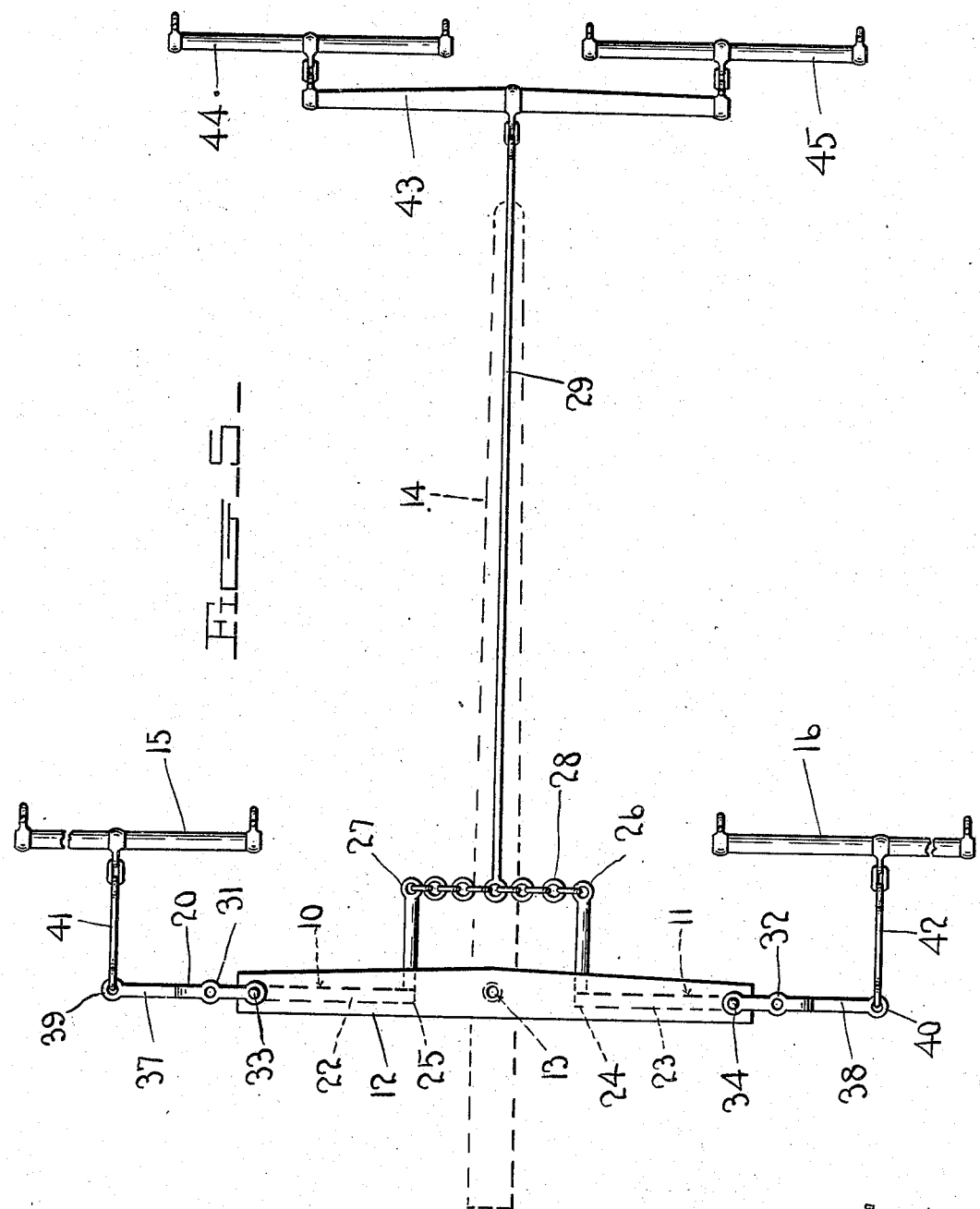

WILLIAM H. SCHULTZ, OF CAMERON, IDAHO.

DRAFT-EQUALIZER.

937,185.  Specification of Letters Patent.  Patented Oct. 19, 1909.

Application filed June 30, 1908. Serial No. 441,193.

*To all whom it may concern:*

Be it known that I, WILLIAM H. SCHULTZ, a citizen of the United States, residing at Cameron, in the county of Nez Perce, State of Idaho, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, and has for one of its objects to provide a simply constructed device of this character adapted to be attached to an ordinary double-tree whereby one additional horse or two additional horses may be coupled to the double-tree, and the "draft" of all of the horses be equalized.

With this and other objects in view the invention consists in two evener bars adapted to be adjustably coupled intermediate their ends to a double-tree with means for coupling swingle-trees to the evener bars at their outer ends and means for coupling a double-tree or a swingle-tree to the inner ends of the evener bars.

The invention further consists in two evener bars having intermediate U-shaped portions near one end with spaced apertures through the U-shaped portions and flexible means uniting the longer confronting ends to the bars, the U-shaped portions adapted to bear over a double-tree at the ends and being adjustably and detachably connected thereto by pins inserted through the apertures, whereby a double-tree or a swingle-tree as required may be operatively associated with the ordinary double-tree of a vehicle.

The invention further consists in certain novel features of construction as hereafter shown and described and then specifically pointed out in the claim, and in the drawings illustrative of the preferred embodiment of the invention, Figure 1 is a plan view of the improved device arranged for three horses. Fig. 2 is a section on the line 2—2 of Fig. 1. Fig. 3 is a front elevation of the double-tree and its attachments as shown in Fig. 1. Fig. 4 is a perspective view of one of the lever members, detached. Fig. 5 is a view similar to Fig. 1 illustrating the arrangement of the parts when four horses are employed.

It is frequently desirable to connect three horses or four horses to a vehicle, or to agricultural implements of various kinds, and the principal object of the present invention is to provide a simply constructed device whereby a supplemental double-tree and its swingle-trees or a supplemental swingle-tree may be coupled to or associated with an ordinary double-tree, the latter being attached to the vehicle or other structure in the ordinary manner, and to provide easily operative means whereby the device may be changed to employ three horses or four horses as required and without making structural changes in the improved device or in the swingle-trees or double-trees employed.

The improved device comprises two evener bars represented as a whole respectively at 10—11 and each formed near one end with a U-shaped portion adapted to bear over the ends of a double-tree 12, the U-shaped portion having spaced vertically alining apertures through which the pivot pins pass to enable the evener bars to be coupled adjustably and swingingly to the double-tree. The double-tree 12 is connected in the usual manner by a draw pin 13 to a draft tongue indicated at 14. The outer portions 37—38 of the evener bars are provided with eyes 39—40 to receive links 41—42, the latter having swingle-trees 15—16 coupled thereto at their outer ends. The evener bars are extended inwardly beneath the double-tree 12 as shown at 22—23 and thence extended downwardly at 25—24 and thence laterally or forwardly at 27—26, the terminals of the lateral portions 27—26 being united by a flexible element, such as a chain 28 to which a rod 29 is coupled leading beneath the tongue 14 to a swingle-tree 17 to which it is coupled. The other legs of the U-shaped portion 20—21 bear over the upper surface of the double-tree 12 and are provided with spaced eyes 31—32 at their inner ends to receive draw pins 33—34, the draw pins likewise adapted to extend through eyes 35—36 in the evener bars. By this means it will be obvious that the evener bars may be adjustably coupled to the double-tree 12 to adapt the device to three horses or four horses.

When the pins 33—34 are arranged through the apertures 31—36 nearest to the outer ends of the evener bars as shown in Fig. 1, the device will be in position to be coupled to the swingle-tree 17, the "leverage" of the evener bars being thus arranged to equalize the draft between the single horse attached to the swingle-tree 17 and the two horses attached to the swingle-trees 15—16. When however, it is desired to employ four horses, the pins 33—34 are removed and the evener bars adjusted outwardly in opposite directions to enable the pins 33—34 to be inserted through the inner sets of apertures, the latter being located midway between the eyes 39—40 and the portions 25—24 of the evener bars. A double-tree 43 is coupled to the rod 29, the double-tree having swingle-trees 44—45 of usual construction. By this arrangement it will be obvious that the draft is equalized between both sets of double-trees and swingle-trees, as the leverage of the evener bars is correspondingly equalized.

The improved device is simple in construction, can be inexpensively manufactured, and is readily applicable to the purposes required.

The evener bars 10—11 together with their U-shaped portions and extensions are preferably each formed from a single piece of forged metal bent into the required shape.

What is claimed, is:

A draft equalizer comprising a double-tree, an equalizing lever at each end of the double-tree consisting of vertically spaced arms lying respectively above and below the double-tree and a stem extending away from the double-tree and in the plane of the double-tree, said arms having each a plurality of perforations, a pivot pin removably engaged with a pair of perforations of the arms of each equalizing lever and with the corresponding end of the double-tree, a draft appliance connected with the free end of each of said stems, the lower arm of each equalizing lever extending beyond the upper arm toward the center of the double-tree, and then forwardly at right angles, an additional draft appliance, and chains connected to the right angular extensions of the equalizing levers and to said additional draft appliance.

In testimony whereof, I affix my signature, in presence of two witnesses.

WILLIAM H. SCHULTZ.

Witnesses:
 U. S. G. EVANS,
 HERBERT SLOCUM.